United States Patent [19]

Bugar et al.

[11] Patent Number: 5,108,709

[45] Date of Patent: * Apr. 28, 1992

[54] COLOR-CODED DISPOSABLE-FILTER HOLDER

[75] Inventors: Robert Bugar, Einbeck; Asok Chakraborty, Göttingen; Herbert Urlaub, Einbeck, all of Fed. Rep. of Germany

[73] Assignee: Schleicher & Schuell GmbH, Fed. Rep. of Germany

[*] Notice: The portion of the term of this patent subsequent to Jan. 22, 2008 has been disclaimed.

[21] Appl. No.: 587,923

[22] Filed: Sep. 25, 1990

[30] Foreign Application Priority Data

Sep. 29, 1989 [EP] European Pat. Off. ........ 89118146.3

[51] Int. Cl.⁵ ............................................. B01L 11/00
[52] U.S. Cl. ..................................... 422/101; 422/104; 403/338; 210/94; 210/446; 55/503; 55/510
[58] Field of Search .............. 422/101, 104; 220/4.24; 141/286, 329; 55/503, 510; 403/338, 335, 341; 285/364, 365, 366, 367, 406, 407, 408, 409, 410, 411, 423; 210/94, 446; 383/63

[56] References Cited

U.S. PATENT DOCUMENTS

| | | | |
|---|---|---|---|
| 2,879,207 | 3/1959 | Poitras | 210/446 |
| 3,932,153 | 1/1976 | Byrns | 210/446 |
| 4,111,807 | 9/1978 | Boomus et al. | 210/446 |
| 4,170,056 | 10/1979 | Meyst et al. | 210/446 |
| 4,713,900 | 12/1987 | Calloway, Jr. et al. | 40/324 |
| 4,829,641 | 5/1989 | Williams | 383/63 |
| 4,874,513 | 10/1989 | Chakraborty et al. | 210/446 |
| 4,986,904 | 1/1991 | Bugar et al. | 210/94 |

FOREIGN PATENT DOCUMENTS 0202884 11/1986 European Pat. Off. .
2837058 3/1980 Fed. Rep. of Germany .

Primary Examiner—Robert J. Warden
Assistant Examiner—Laura E. Collins
Attorney, Agent, or Firm—Lowe, Price, LeBlanc & Becker

[57] ABSTRACT

The color coded disposable-filter holder 1 of the invention comprises of a first molded pane-like housing part 2 with an intake stub 3 and a second molded pane-like housing part 4 comprising a discharge stub 5. The two housing parts 2, 4 are rigidly joined in pressure-resistant and hermetic manner at their radially outer zones 7 pointing to each other while enclosing a planar filter 6. This disposable-filter holder is provided with a color coding consisting of a dyed plastic in the form of a prefabricated plastic ring or plastic clip 9 present in an annular groove 8 in the radially outer zone of the disposable-filter holder.

6 Claims, 1 Drawing Sheet

COLOR-CODED DISPOSABLE-FILTER HOLDER

BACKGROUND OF THE INVENTION

The disposable-filter holder of the invention is applicable in particular for pressure filtration. The terms "filter" and "pressure filtration" herein also cover similar procedures such as ultra-filtration, reverse osmosis and plain gravity filtration.

As a rule disposable-filter holders of the above species consist of a plastic, two-part housing of which the two housing halves are joined in pressure-tight manner and are flat and boxy. Such disposable-filter holders comprise an inner, essentially flat cavity which is divided by a filter, illustratively a membrane filter, into an intake-side pressurized chamber and a discharge-side filtrate chamber. The filter is secured in conventional manner against tearing by a filter support formed in the lower housing.

As a rule such disposable-filter holders will be used whenever it is desired to filter small and minute volumes of fluid rapidly, reliably and where called for in sterile manner. They are used especially in labs, for instance when preparing high-purity reagent solutions. Another significant field of application is in medical and pharmaceutical labs.

The multiplicity of such applications requires disposable-filter holders which for constant housing and filter dimensions differ merely by the filter characteristics such as the filter material or its pore size and degree of sterility. Because such disposable-filter holders are mass-produced, they must be coded in simple and reliable as well as in distinctive manner. This differentiation may be carried out for instance by individually coding one or both housing parts, illustratively by dyeing the housing material or by characteristic embossing. The disposable-filter holders which are so coded incur the drawback that in the event of a change in production, the mold type must be changed or the entire injection equipment, including the extruder, must be cleaned because another dye is required.

It is known from the German patent document C 28 37 058 how to make disposable-filter holders of different types but with the same housing. The housing halves of one type which are identical for one size are joined in geometrically or frictionally locking manner with the filter being inserted and then are made gas and pressure tight by an injected plastic sealing ring dyed according to the filter code.

This known disposable-filter holder suffers from the drawback that the colored sealing ring must meet simultaneously the functions of hermeticity and sealing on one hand and on the other of coding. Moreover, this sealing ring must enclose both the upper and the lower housing parts. Further, the injection by means of the dyed ring only can take place after the upper and the lower housing parts have been joined. Accordingly this injection molding must take place on the assembled disposable-filter holder.

SUMMARY OF THE INVENTION

In the light of this state of the art, the object of the present invention is to create a disposable-filter holder of the above species which shall be economical and for which the hermeticity and locking functions shall be separate and which furthermore is color-coded in reliable and environment-fast manner.

Accordingly the color-coded disposable-filter holder of the invention is also characterized in that its color-coding consists of a pre-fabricated plastic ring or clip. This plastic ring is inserted into an annular groove in the radial outside of the disposable filter and consists of a dyed plastic. The disposable-filter holder also is made of plastic and consists of a first pane-like (especially disk-like) housing part with an intake stub and of a second also pane-like (especially disk-like) housing part with a discharge stub. The two housing parts are rigidly joined to each other with insertion of a planar filter at their radially outward zones in hermetic and pressure-resistant manner. The two housing parts are joined together in the area of two, essentially annular axial surfaces and this connection may be geometrically or frictionally locking. Illustratively this connection may be implemented by bonding. Preferably however it shall be carried out conventionally by ultrasonic welding which results in good automation of joining, at low manufacturing cost and satisfactory hermeticity. Illustratively one of the housing parts may comprise an annular groove engaged by an annular spring when the two housing parts are being assembled and are being joined together by ultrasonic welding.

The plastic ring serving as color coding is a prefabricated and appropriately an injection-molded elastomer plastic ring. This plastic ring may be assembled when the housing parts are being joined or also thereafter.

By using a plastic ring made prior to the actual manufacturing of the disposable-filter holder, storage costs are in fact increased. On the other hand the plastic ring is small; thousands of such plastic rings may be suitably stored in a comparatively small package and be moved to the manufacturing site.

However using a prefabricated plastic ring brings with it the essential advantage that during the joining of the housing parts, no injection molding of any sort need be carried out anymore in order to fabricate the plastic ring itself and/or to mount it to the disposable filter. Therefore the need no longer exists to insert the already assembled disposable-filter holder-which on account of its intrinsic shape is not easily handled-into an injection molding device where it would be fitted with a color coding in a separate production step.

Preferably the plastic ring serving as color coding shall be cross-sectionally planar. Such a planar ring is flat with its largest dimension relative to the ring being axial.

This planar ring is mounted on the outer surface of the disposable-filter holder. It is inserted into an annular groove in the outer surface of the first housing part and/or of the second housing part. Appropriately half of the groove is present in each housing part, the total groove then being created when the two housing parts are being assembled.

If the plastic ring is the above annular planar ring, then advantageously it shall be mounted already when the two housing parts are being assembled, illustratively by slipping it on that side of the first housing part which is away from the stub and represents this part's pane-like area, whereupon the second housing part is made to insert with its pane-like zone into the plastic ring and is placed on the matching pane-like area of the first housing part. Thereupon the two housing parts can be joined together for instance by ultrasonic welding. In this step the plastic ring may be fused into both housing parts. However this is not mandatory, and therefore it may be enough that only the two housing parts be welded together without thereby rigidly fixing the plastic ring in place.

In a further preferred embodiment mode of the invention, the plastic ring is a washer. The largest dimension of the ring proper therefore is in the radial direction. This washer is inserted into an annular groove present at least in the radially outer zone of the axially directed end surface of one of the two housing parts. Obviously the disposable-filter holder of the invention also may be fitted with such an annular groove that it shall be equipped with two washers.

Both the cross-sectionally planar ring and the washer can be mounted in conventional manner in the associated annular groove. Preferably said rings and washers and the matching groove are of such dimensions that the particular ring can snap permanently and in tightly fitting manner into its annular groove. For that purpose the annular groove and the plastic ring preferably evince an areally congruent and especially a rectangular cross-section.

The two housing parts of the disposable filters preferably consist of an at least substatively transparent plastic and again preferably shall be made by injection molding. The color coding and hence the plastic ring preferably shall consist of an essentially opaque dyed plastic.

BRIEF DESCRIPTION OF THE DRAWINGS

The invention is elucidated below by two illustrative embodiments in relation to the FIGURES.

DETAILED DESCRIPTION OF THE INVENTION

Figure 1:
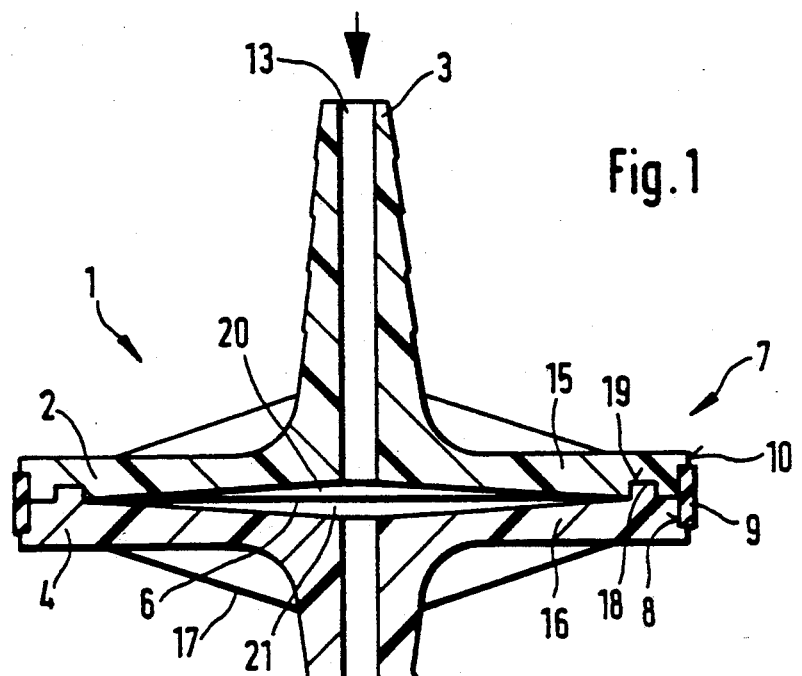
FIG. 1 is an axial and schematic section of a disposable-filter holder of the invention.

The disposable-filter holder 1 of the invention shown in FIG. 1 consists of a first and essentially pane-like housing part 2 with an intake stub 3 and of a second and also pane-like housing part 4 comprising a discharge stub 5. The intake stub 3 and the discharge stub 5 are shaped like tubular nozzles and each comprise a continuous and mutually aligned borehole 13 and 14.

The pane-like zones 15 and 16 of the housing parts 2 and 4 comprise reinforcing ribs 17 mounted in star-manner in the direction of the intake stub 3 or the discharge stub 5 and serving to prevent these stubs from breaking when omitted hoses are being hooked up.

The two housing parts 2 and 4 enclose a planar filter 6 and are joined to each other at their radially outer, mutually facing zones. This connection may be arbitrary and known per se. As regards the embodiment mode shown in FIG. 1, the housing part 4 includes an annular rib 18 received in an equally circular groove 19 and thereby is joined together for instance by ultrasonic welding in hermetic and pressure-resistant manner.

The filter 6 illustratively may be a membrane filter and divides the disposable-filter holder 1 into a pressurized chamber 20 and a filtrate chamber 21. The direction of flow of the medium being filtered is shown by an arrow in FIG. 1. To support the filter 6, the housing part 4 may be provided with concentric resting ribs which however are omitted from FIG. 1.

The disposable-filter holder shown in FIG. 1 is equipped with an annular groove 8 closed on itself and present at the circumference 10 of the disposable-filter holder. This annular groove 8 is cleared half in the circumference 10 of the housing part 2 and half in the circumference 10 of the housing part 4. Together these two clearances result in the said annular groove 8 of which the cross-section is rectangular. A prefabricated and dyed plastic ring or clip 9 also of rectangular cross-section is inserted into this annular groove 8. As regards the embodiment mode shown in FIG. 1, the plastic ring 9 radially projects outward beyond the circumference 10 of the housing parts 2 and 4. However this plastic ring may be so sized as to just fill the annular groove 8 and thereby is flush with the circumference 10.

In order to manufacture the disposable-filter holder shown in FIG. 1, the plastic ring 9 is slipped onto the housing part 2 whereby it comes to rest in the half of the annular groove 8 cleared in the circumference 10 of the housing part 2. Next the housing part 4 with its pane-like zone 16 is moved against the pane-like zone 15 of the housing part 2 in such manner that the pane-like zone 15 shall rest "inside" the plastic ring 9 and the spring 18 shall enter the groove 19. Thereupon the two housing parts 2, 4 are joined together in gas-tight and liquid-tight manner by ultrasonic welding.

Figure 2:
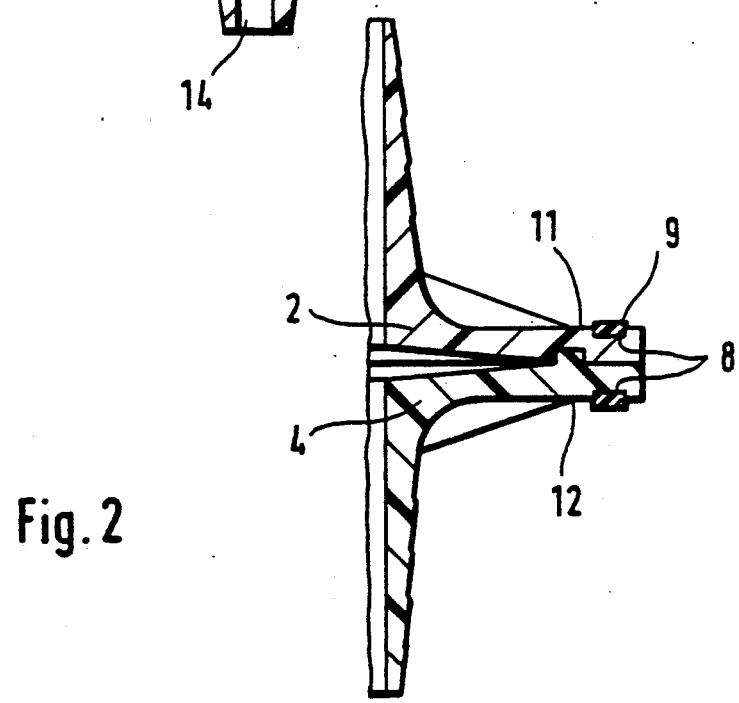
FIG. 2 is a partial axial section of a second illustrative embodiment of a disposable-filter holder of the invention.

The disposable-filter holder shown in FIG. 2 mainly differs from the embodiment shown in FIG. 1 by being provided with two coding plastic rings 9 each mounted in the radially outward zone of the axially outward end surfaces 11, 12 of the housing parts 2, 4. Obviously only one such plastic ring and one such annular groove may also be used.

The plastic rings 9 are colored elastomer rings set into the annular grooves 8. The sizes of the plastic rings 9 are such as to allow these rings being snapped into the annular grooves 8 where they then are being held permanently.

We claim:

1. A plastic, color-coded disposable-filter holder comprising a first molded housing part including an intake stub and a second housing part including a discharge stub, said first and second housing parts being rigidly joined together in a hermetic and pressure-resistant manner at their radially outer zones contacting one another and defining a radially outer zone of the disposable filter holder, with a planar filter inserted between the first and second housing parts, and with a color coding of a dyed plastic present in an annular groove in the radially outer zone of the disposable-filter holder, wherein the color coding is a prefabricated plastic ring or plastic clip.

2. Color coded disposable-filter holder defined in claim 1, wherein the plastic ring is a cross-sectionally planar ring (9) and the annular groove (8) is present in the circumference (10) of the first housing part (2) and/or of the second housing part (4).

3. Color coded disposable-filter holder defined in claim 1, wherein the plastic ring is a cross-sectionally planar ring (9) and the annular groove (8) is present in the radially outer zone (7) of the axially outward end surface (11, 12) of at least one of the two housing parts (2, 4).

4. Color coded disposable-filter holder defined in claim 1, wherein the annular groove (8) is dimensioned to receive the plastic ring (9) in snap fitting permanent engagement.

5. Color coded disposable-filter holder defined in claim 1, wherein the annular groove (8) and the plastic ring (9) are of rectangular cross-section.

6. Color coded disposable-filter holder defined in claim 1, wherein the plastic ring (9) is made of a substantially opaque plastic and the housing parts (2, 4) are made of a substantially transparent plastic.

* * * * *